United States Patent [19]
Treharne et al.

[11] 3,843,997
[45] Oct. 29, 1974

[54] PROCESS FOR OBTAINING CORIUM FROM BOVINE HIDE

[75] Inventors: Timothy John Mingay Treharne, East Grinstead; David Henry Tuck, Bromley, both of England

[73] Assignee: Viskase Limited, Croydon, England

[22] Filed: Mar. 2, 1973

[21] Appl. No.: 337,373

[30] Foreign Application Priority Data
Mar. 6, 1972   Great Britain................... 10366/72

[52] U.S. Cl. .................................................. 17/47
[51] Int. Cl............................................. A22b 5/08
[58] Field of Search ............ 17/45, 47, 50; 106/164; 264/188

[56] References Cited
UNITED STATES PATENTS
2,310,969   2/1943   Lilienfield et al................... 106/164
3,684,540   8/1972   Henderson.......................... 106/164
3,744,088   7/1973   Snowden................................ 17/47

Primary Examiner—G. E. McNeill
Attorney, Agent, or Firm—Brisebois & Kruger

[57] ABSTRACT

Corium, suitable for processing into edible food casings, is obtained from fresh, unsalted bovine hide by a process involving cooling the hide to 15° C. or below by washing, de-hairing the cooled hide with a lime solution of pH 12.6 or less and temperature not exceeding 15° C., washing the limed hide, defleshing, and finally removing the epidermal layer together with all hair follicles.

17 Claims, No Drawings

PROCESS FOR OBTAINING CORIUM FROM BOVINE HIDE

The present invention relates to a process for obtaining corium from bovine hide.

The present invention provides a process for obtaining corium from bovine hide, which comprises washing fresh unsalted bovine hide to reduce the hide temperature to 15° C. or below, de-hairing the cooled hide by contacting it with a lime solution having a pH not exceeding 12.6 (and preferably not exceeding 12.2) and a temperature not exceeding 15° C., washing the limed hide, de-fleshing the hide, and removing the epidermal layer and substantially all hair follicles from the de-fleshed hide.

As will be appreciated by those skilled in the art, corium comprises the middle layer of bovine hide, sandwiched between the outer epidermal or "grain" layer and the inner fleshing.

Corium obtained by the process of the invention is suitable for processing into edible casings for sausage meat and other foods, for example, by the method described in Example 1 of U.S. Pat. No. 3,684,540 (Henderson et al). It will be noted that, whereas Example 1 of Henderson uses limed hide derived from salted beef hide, the present invention obtains a suitable starting material from fresh unsalted hide. The present invention accordingly also provides edible casings manufactured from corium obtained by the process described herein. Hitherto, edible food casings have generally been manufactured from the small intestines of sheep or pigs.

It is an important feature of the present invention that the process is carried out on fresh hide, and it is desirable that the whole process should be completed in as short a time as possible. Advantageously, the process is completed within 24 hours of the death of the animal, and preferably within 18 hours.

By cooling the hide to 15° C. or below before the liming operation and keeping the hide temperature within this range during liming, undesirable hydrolysis of the hide resulting from moisture absorption is reduced. Preferably, the hide temperature is reduced to a value not exceeding 11° C. before the liming operation, and is preferably maintained within that range during liming. After being cooled by washing, the cooled hide may be allowed to soak for a time to assist in the removal of dung, blood, and other extraneous matter, which can then be washed away. Normally, trimming of the hide will be effected immediately prior to washing.

Desirably, the pH of the lime solution does not exceed the minimum required to effect satisfactory de-hairing of the hide. It will generally be found that a pH of about 11.6 will be the minimum required for this purpose. By restricting the pH of the lime solution as far as possible, alkaline hydrolysis of the corium proteins is correspondingly limited, so that breakdown of the fibrous structure of the corium is kept to a minimum. Typically, the time required to effect satisfactory de-hairing will be at least 10 hours. The liming solution preferably includes a small quantity of sodium hydrosulphide, say about 1 percent by weight. This tends to reduce alkalinity and to reduce the risk of contamination of the corium by iron compounds. A typical liming solution for use in the process of the present invention may, for example, have the following composition:

| | Parts by weight |
|---|---|
| Hydrated lime | 1 |
| Sodium hydrosulphide | 1 |
| Water | 100 |

Sodium sulphide is commonly present in liming solutions used in leather manufacture, but its presence in the liming solutions used in the process of the present invention is generally very undesirable. The use of a liming solution not containing sodium sulphide both enables the desired pH to be obtained readily and serves to reduce the risk of contamination of the corium by iron compounds. Iron contamination is especially undesirable when the corium is to be processed into food casings, because it leads to discolouration of such casings.

The preliminary washing step and the liming operation may be carried out in the kind of apparatus used conventionally for similar process steps in leather manufacture. For example, the hide may be washed in apparatus which includes a rotatable drum. In such apparatus, a degree of mild agitation can be produced simply by rotating the drum. Such agitation is advantageously effected intermittently or continuously during liming of the hide.

Separation of the corium from the epidermal (or grain) layer may be effected by scraping off the epidermal layer from the de-fleshed hide, but is preferably effected by a splitting operation. Such splitting may be brought about by means of a band knife or a rotary knife. In general, the upper layer will be removed to a depth of 2.5 mm; the removal of a layer of this thickness ensures that the whole of the epidermal layer is removed and that no hair follicles remain in the corium. The separated grain layer may, after further liming, be processed into leather.

In order to obtain the optimum results in terms of the physical strength of edible food casings ultimately produced from the corium, the process of the invention should be carried out on hides obtained from animals aged from 1½ to about 2 years.

The following Example illustrates the invention:

EXAMPLE

A quantity of fresh bovine hide was trimmed to remove the tail, shanks, ears and face, and was then washed to reduce the hide temperature to less than 15° C. The hide was then allowed to soak at a temperature below 15° C. for 1 hour, after which time the hide was washed to remove dung, blood, and other extraneous matter that had been loosened by the soaking.

The washed hide was de-haired by treatment with a lime solution having the following composition:

| | Parts by weight |
|---|---|
| Hydrated lime | 1 |
| Sodium hydrosulphide | 1 |
| Water | 100 |

A sufficient quantity of the lime solution was used to give a ratio by weight of water: hide of 3:1. The hide was contained in a rotatable drum immersed in the lime solution, and the drum was rotated for periods of 10 minutes at intervals of 30 minutes over a total period of 10 hours.

After liming, the hide was washed for about 20 minutes to remove loosened hair and other extraneous material, the emperature of the hide being maintained at or below 11° C. throughout the washing operation.

The washed hide was de-fleshed, and the de-fleshed hide was split by means of a rotary knife to separate the corium from the epidermal layer, care being taken to ensure that no hair follicles were present in the corium layer so obtained.

We claim:

1. A process for obtaining corium from bovine hide, which comprises washing fresh unsalted bovine hide to reduce the hide temperature to 15° C. or below, de-hairing the cooled hide by contacting it with a lime solution having a pH not exceeding 12.6 and a temperature not exceeding 15° C., washing the limed hide, de-fleshing the hide, and obtaining corium from the de-fleshed hide by removing from said de-fleshed hide the epidermal layer together with substantially all hair follicles, thereby leaving corium as residue.

2. A process as claimed in claim 1 wherein, prior to the de-hairing operation, the hide temperature is reduced to 11° C. or below.

3. A process as claimed in claim 1, wherein the pH of the liming solution does not exceed 12.2.

4. A process as claimed in claim 1, wherein the pH of the liming solution is approximately 11.6.

5. A process as claimed in claim 1, wherein the liming solution includes sodium hydrosulphide.

6. A process as claimed in claim 5, wherein the liming solution includes approximately 1 percent by weight of sodium hydrosulphide.

7. A process as claimed in claim 1, wherein the liming solution contains substantially no sodium sulphide.

8. A process as claimed in claim 1, wherein the hide remains in contact with the liming solution for a period of at least 10 hours.

9. A process as claimed in claim 1, wherein the liming solution/hide mixture is agitated intermittently or continuously in the course of the de-hairing operation.

10. A process as claimed in claim 1, wherein removal of the epidermal layer and hair follicles is effected by a splitting operation.

11. A process as claimed in claim 10, wherein the splitting operation is effected by means of a band knife or a rotary knife.

12. A process as claimed in claim 1, wherein in the course of removing the epidermal layer, the upper layer of the de-fleshed hide is removed to a depth of 2.5 mm.

13. A process as claimed in claim 1, wherein removal of the epidermal layer and hair follicles is effected by scraping.

14. A process as claimed in claim 1, wherein the separated epidermal layer is processed into leather.

15. A process as claimed in claim 1, wherein the steps required to obtain corium are completed within 24 hours of the death of the animal.

16. A process as claimed in claim 15, wherein the said steps are completed within 18 hours of the death of the animal.

17. A process as claimed in claim 1, which is carried out on hide obtained from animals 1½ to 2 years old.

* * * * *